US010295397B2

(12) United States Patent
Nance

(10) Patent No.: US 10,295,397 B2
(45) Date of Patent: May 21, 2019

(54) METHOD FOR VALIDATION AIRCRAFT TAKE-OFF WEIGHT INDEPENDENT OF MEASURING THE AIRCRAFT WEIGHT

(71) Applicant: C Kirk Nance, Keller, TX (US)

(72) Inventor: C Kirk Nance, Keller, TX (US)

(*) Notice: Subject to any disclaimer, the term of this patent is extended or adjusted under 35 U.S.C. 154(b) by 0 days.

(21) Appl. No.: 15/388,440

(22) Filed: Dec. 22, 2016

(65) Prior Publication Data
US 2018/0188102 A1    Jul. 5, 2018

Related U.S. Application Data

(60) Provisional application No. 62/271,806, filed on Dec. 28, 2015.

(51) Int. Cl.
   *G01G 19/07* (2006.01)
(52) U.S. Cl.
   CPC .................................. *G01G 19/07* (2013.01)
(58) Field of Classification Search
   CPC ........................................................ G01G 19/07
   See application file for complete search history.

(56) References Cited

U.S. PATENT DOCUMENTS

| 2007/0255489 A1* | 11/2007 | Jensen | G01G 19/07 701/124 |
| 2008/0119967 A1* | 5/2008 | Long | G01G 19/07 701/3 |
| 2009/0192846 A1* | 7/2009 | Stefani | G01G 19/07 705/7.41 |
| 2010/0121560 A1* | 5/2010 | Vetsch | G01M 1/125 701/124 |

\* cited by examiner

*Primary Examiner* — Matthew G Marini
(74) *Attorney, Agent, or Firm* — Geoffrey A. Mantooth; Brian K. Yost

(57) ABSTRACT

A method for validating or invalidating the computed weight of an aircraft, where the computed weight of the aircraft is determined by compiling various weight assumptions added to a known empty weight of the aircraft. The method measures the aircraft center of gravity, determines the percentage of computed weight supported by the combined main landing gear struts, and using a database such as a look-up table to validate if the percentage of computed weight is determined within a reasonable range to the measured load on the combined main landing gear struts. Sensors are attached to the landing gear struts, so to measure and monitor aircraft loads and center of gravity without measuring the aircraft weight.

7 Claims, 6 Drawing Sheets

METHOD FOR VALIDATION AIRCRAFT TAKE-OFF WEIGHT INDEPENDENT OF MEASURING THE AIRCRAFT WEIGHT

BACKGROUND OF THE INVENTION

For safe operation of an aircraft, the weight of the aircraft must be determined prior to take-off. Airlines (also referred to as: FAA/Part 121 "Air Carriers") have strict departure schedules, which are maintained to maximize aircraft utilization each day. Today's airline operations typically do not place fully loaded aircraft upon scales as a means to measure the aircraft weight, and the distribution of that weight, commonly referred to as the aircraft Center of Gravity ("CG"), prior to an aircraft's departure ("dispatch") from an airport gate.

On any single day within the United States, airlines average 28,537 departures; where each of these air carriers must determine the weight and CG for each aircraft prior to departure. United States population has progressively become heavier over the years; thereby the individual weight of each passenger on these aircraft has become heavier. Airlines around the world operate on very strict time-schedules, where even a short departure delay occurring early in the day can have a ripple effect and create scheduling problems throughout the airline's remaining flight schedule. Aircraft load planning is a crucial part of keeping an airline operating on schedule. A scheduled aircraft departure will commence its load planning process up to one year prior to the actual flight. Airlines do not offer ticket sales for a flight more than twelve months prior to the flight. As each ticket for a scheduled flight is purchased, the average passenger and average checked bag weights are assigned for each ticketed passenger into a computer program, continually updating throughout the year the planned load for that flight. Aircraft have a Maximum Take-Off Weight "MTOW" limitation. Airline load planning procedures use weight assumptions as to the weight of passengers and baggage loaded onto the aircraft, provided by Aviation Regulatory Authorities, to stay below the aircraft MTOW limitation.

Aircraft weights are limited by Federal Aviation Administration "FAA" Regulation. The FAA is the Regulatory Authority which regulates the design, development, manufacture, modification and operation of all aircraft operated within the United States, and will be referenced along with the term "Regulatory Authority" to indicate both the FAA and/or any governmental organization (or designated entity) charged with the responsibility for either initial certification of aircraft or modifications to the certification of aircraft. Examples of Regulatory Authorities would include: European Aviation Safety Agency "EASA", within most European countries; Transport Canada, Civil Aviation Directorate "TCCA", in Canada; Agência Nacional de Aviação Civil "ANAC" in Brazil; or other such respective Regulatory Authority within other such respective countries.

FAA Regulations (provided in the Code of Federal Regulations) are the governmental regulations, which detail the requirements necessary for an aircraft to receive certification by the Regulatory Authority within the United States. These would be equivalent to such regulations within the Joint Aviation Regulations "JARs" which are used in many European countries.

Title 14 of the Code of Federal Regulations, Part 25 refers to regulations, which control the certification of Air Transport Category aircraft ("Part 25 aircraft".) Part 25 aircraft include most of the commercial passenger aircraft in use today. For example, Part 25 aircraft include: Boeing model numbers 737, 747, 757, 767, 777; Airbus model numbers A300, A310, A320, A330, A340, etc. The FAA regulations allow for control mechanisms to assure Part 121 air carriers manage aircraft loading procedures to confirm at the completion of the loading process that the aircraft load distribution remains within the aircraft's certified forward and aft CG limits.

In particular:
Title 14—Code of Federal Regulations:
Part 121-695, subparagraph (d)
§ 121.695 Load Manifest: All Certificate Holders
The load manifest must contain the following information concerning the loading of the airplane at takeoff time:
(a) The weight of the aircraft, fuel and oil, cargo and baggage, passengers and crewmembers.
(b) The maximum allowable weight for that flight that must not exceed the least of the following weights:
  (1) Maximum allowable takeoff weight for the runway intended to be used (including corrections for altitude and gradient, and wind and temperature conditions existing at the takeoff time).
  (2) Maximum takeoff weight considering anticipated fuel and oil consumption that allows compliance with applicable en route performance limitations.
  (3) Maximum takeoff weight considering anticipated fuel and oil consumption that allows compliance with the maximum authorized design landing weight limitations on arrival at the destination airport.
  (4) Maximum takeoff weight considering anticipated fuel and oil consumption that allows compliance with landing distance limitations on arrival at the destination and alternate airports.
(c) The total weight computed under approved procedures.
(d) Evidence that the aircraft is loaded according to an approved schedule that insures that the center of gravity is within approved limits.
(e) Names of passengers, unless such information is maintained by other means by the certificate holder.

If an airline is found to be operating a Regulated aircraft with weights in excess of the aircraft's certified weight limitations, that airline is subject to Federal penalties and fines. It is a violation of Federal Law to knowingly operate an aircraft, when the aircraft weight has exceeded any of the Original Equipment Manufacture's ("OEM's") certified weight limitations.

All air carriers must have FAA approved procedures in place ("an approved schedule"), in which the air carrier will follow such procedures to insure each time an aircraft is loaded, the load will be distributed in a manner that the aircraft CG will remain within the forward and aft CG limitations. The FAA and the specific air carrier develop these procedures, which are often referred to as "loading laws" and when implemented define how the aircraft is loaded. An accurate determination of the total passenger weight portion of a flight could most readily be accomplished by having a scale located at the entrance to the aircraft door, by which all weight that enters the aircraft would be measured. Though this solution sounds simple, having the measured weight of the passengers and their carry-on items could cause substantial disruption in an airline's daily flight schedule. Such disruption would occur moments before the aircraft is scheduled to depart and when it is discovered that the aircraft measured weight does not match the aircraft's planned, or computed, weight. Even if the weight differential is only a few hundred pounds, the flight would be delayed until the discrepancy was resolved. Numerous aircraft delays could result with many dissatisfied passengers, which could be required to be removed from their planned flight.

The FAA has established guidelines through the issuance of an Advisory Circular AC No: 120-27E, dated Jun. 10, 2005, "Aircraft Weight And Balance Control" in which an airline is allowed to determine aircraft weight through the adoption of a "weight and balance control program" for aircraft operated under Title 14 of the Code of Federal Regulations (14CFR) part 91, subparts 121, 125 and 135. Part 121 deals with scheduled air carrier operations, including airlines such as American, Delta, United and Southwest.

The aircraft operator will use approved loading schedules to document compliance with the certificated aircraft weight limitations contained in the aircraft manufacturer's Aircraft Flight Manual (AFM), for the compiling and summing of the weights of various aircraft equipment, fuel and payload weights, along with the AC120-27E weight designations for passengers and baggage. These types of loading schedules are commonly referred to as the Load Build-Up Method (LBUM).

The aircraft LBUM weight determinations are "computed" with the use of guidance from AC120-27E, which define the approved methods to determine the aircraft weight using "weight assumptions" which are independent of any requirement to use scales to measure of the aircraft total weight at dispatch. The fully loaded weight of the aircraft is established through a process of compiling the weights of various payload items based upon FAA approved "designated" average weights, for the varying elements such as passengers, carry-on baggage, checked baggage, crew weight, cargo weight and the weight of fuel loaded; onto a previously measured empty aircraft weight.

On the actual day of a flight, typically two hours prior to the departure of that flight, the airline's automated load planning program will transfer this particular flight plan to the desktop computer display of one of the airline's Flight Dispatchers. It is the responsibility of the Flight Dispatcher to then monitor the planned load of this flight as passengers check-in and board the aircraft. The number of passengers and checked bags are input to the load-planning program. Typically this process goes without interruption and the aircraft will dispatch on schedule, as planned. As the aircraft's door closes and the load-plan is closed-out by the Flight Dispatcher, the aircraft weight associated with the "planned load" will always match the aircraft weight associated with the "departure load" as submitted to the FAA; because both are based on the same collection of weight assumptions used in determining the LBUM. Use of an alternate means to physically measure the total aircraft weight, just as the aircraft door closes, and the possibility of the measured aircraft weight not matching the calculated weight of the LBUM, would have the airline facing a potential departure delay to resolve any difference in the two separate but parallel aircraft weight determinations. This potential for delay in the flight departure on as many as 2,500 daily flights for a single airline, results in the various airlines not willing to take the risk of hundreds of flight delays each day. Many if not most airlines currently dispatch their aircraft under FAA approved LBUM procedures; a method which helps to keep the airlines running on schedule. This also creates an incentive for airlines to continue to use the FAA approved assumed weights, irregardless as to whether the assumed aircraft weight determinations are accurate.

Accurate determination of aircraft take-off weight is an important part of load planning in that it not only adds to the safety of each flight it also is an important consideration regarding the overall life limitation of the aircraft. The aircraft weight can be incorrect by as much as 2,000+ pounds and a "properly balanced" aircraft will still take-off, using an extra 100 feet of the available 10,000 feet of runway.

In addition, accurate determination of take-off weight is important in planning and executing the take-off of the aircraft. In planning the take-off of the aircraft, the pilots rely on the take-off weight of the aircraft to determine the required aircraft speed at take-off and the length of the runway needed to reach that speed. A heavier aircraft requires a higher speed to take-off, and a longer runway to reach that speed, than does a lighter aircraft of the same model. If the aircraft weight is incorrect, then the take-off determinations of speed and runway length will also be incorrect. If the physical runway is shorter than what is needed, the aircraft could crash on take-off.

Thus, the LBUM determined aircraft weight at take-off is subject to the accuracy of the data provided. It is desired to provide some verification of the aircraft weight.

An aircraft is typically supported by plural and in most cases three pressurized landing gear struts. The three landing gears are comprised of two identical Main Landing Gear ("MLG") struts, which absorb landing loads and a single Nose Landing Gear ("NLG") strut used to balance and steer the aircraft as the aircraft taxi on the ground. Designs of landing gear incorporate moving components, which absorb the impact force of landing. Moving components of an aircraft landing gear shock absorber are commonly vertical telescopic elements. The telescopic shock absorber of landing gear comprise internal fluids, both hydraulic fluid and compressed nitrogen gas, and function to absorb the vertical descent forces generated when the aircraft lands. While the weight of the aircraft is resting on the ground, the weight of the aircraft is "balanced" upon three pockets on compressed gas within the landing gear struts.

Measuring changes in the three landing gear strut internal pressures, will in turn identify the aircraft CG, and identify the distribution and subsequent re-distribution of aircraft loads.

In spite of numerous variations in prior art for aircraft On-Board Weight and Balance Systems ("OBWBS"), no U.S. airlines currently use OBWBSs in their daily operations, but instead all major airlines typically use the LBUM to determine aircraft weight and CG.

Though the FAA may continue to assume aircraft weight determinations, as computed within the guidance of AC120-27E, to have zero errors in the aircraft weight determination; a statistical evaluation and review of the FAA approved methods finds significant errors in the LBUM weights which remain un-recognized by the FAA.

SUMMARY OF THE INVENTION

This invention offers new methods with apparatus to validate a computed aircraft weight by verifying the percentage of computed aircraft weight supported by the combined MLG as reasonable, when compared to the measure pressure in the combined MLG.

A determination is made of the percentage of total aircraft weight supported by the MLG, from that of the total computed weight of the aircraft.

The invention compares current measured pressure within the combined MLG struts to that of previously stored combined MLG strut pressure values associated with a previously measured weight supported by the combined MLG. If through comparison, with the use of a look-up table, the combined pressure within the MLG struts is found reasonably close, or within a reasonable range to the previously recorded combined pressure associated with the currently identified percentage of computed aircraft weight supported by the combined MLG; that percentage of computed aircraft weight is then validated. The validated weight supported by the combined MLG, being such a large percentage of the total aircraft weight; then allows for the total computed aircraft weight to also be validated.

If the previously recorded and stored combined MLG pressures, associated with the currently identified percentage of total computed aircraft weight are substantially different for the currently measured pressure within the combined MLG, the computed weight supported by the combined MLG is not found to be within a reasonable range, then the computed total weight of the aircraft is determined invalid.

There is provided a method of validating the computed weight of an aircraft, the aircraft having a means to physically measure the aircraft CG, to determine the percentage of aircraft weight supported by the combined MLG struts and a means to determine the pressure within the landing gear struts. The steps to validate the aircraft computed weight include: identifying the total computed weight of the aircraft, determining the percentage of computed aircraft weight supported by the combined MLG struts, determining the combined pressures within the MLG struts, use of a look-up table to compare the value of the combined pressures of the MLG struts to a "known to be reasonable" pressure range value associated with a known weight supported by the MLG struts.

The method provided herein will verify the computed aircraft weight as reasonable, without measuring the aircraft weight.

If the pressure associated with the computed weight is not within an acceptable range to the pressure associated with an equivalent known weight, the computed weight is then invalidated, and an indication of the invalidated weight is made.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
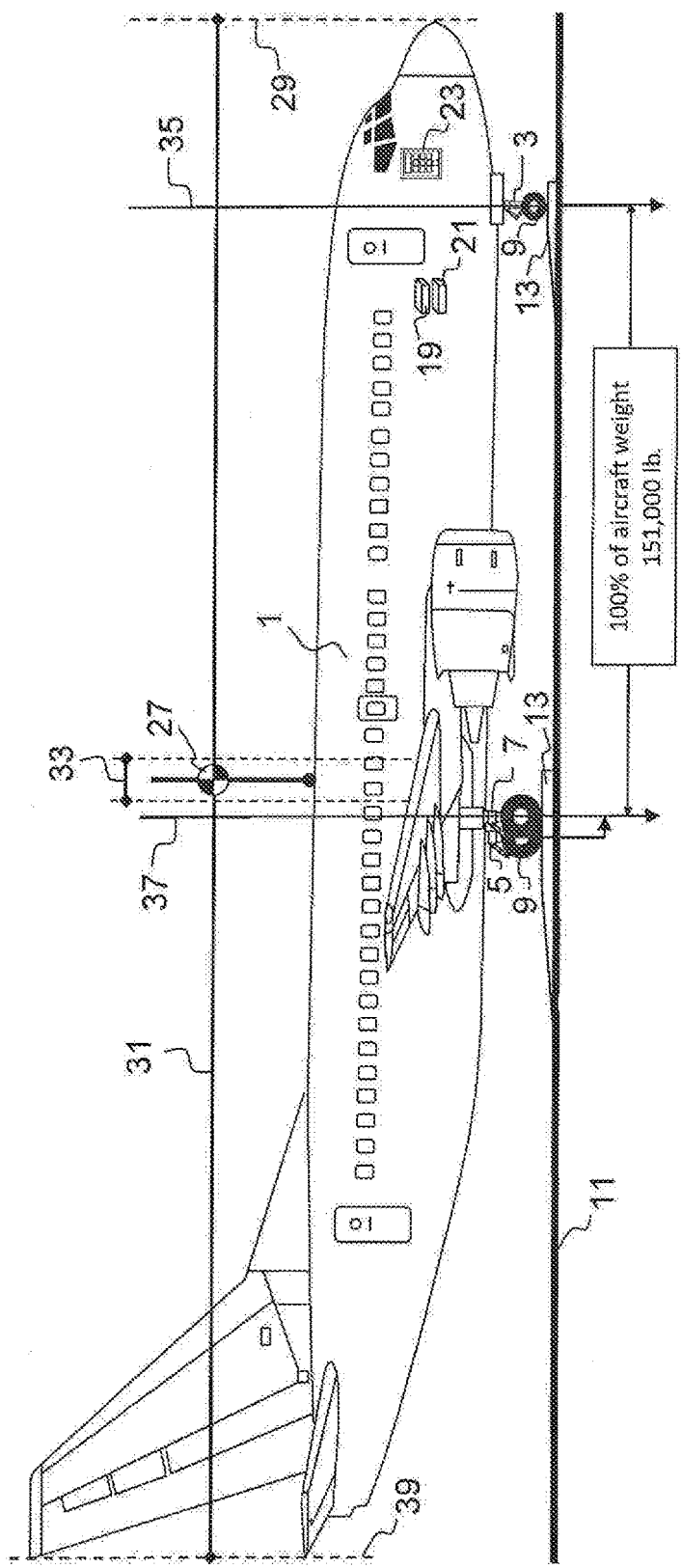
FIG. 1 is a side view of a typical Boeing 737-800 transport category aircraft, illustrating the aircraft center of gravity (CG) through the percentage distribution of the aircraft weight, with the nose landing gear (NLG) and the main landing gear (MLG) of the aircraft deployed and resting on weight measuring ground scales, with various components of the invention.

The present invention provides a measure of accuracy of a computed aircraft take-off weight, which computed weight utilizes data in the form of assumptions and manually entered data. One or both forms of data could be inaccurate to the point of having a significant impact on the take-off of the aircraft.

The present invention accomplishes this task without disrupting aircraft operations. Such a disruption would occur if a measured aircraft weight did not match the computed aircraft weight. The present invention verifies the computed take-off weight without weighing the aircraft.

By providing a check on the computed aircraft weight, the overall operational safety of the aircraft is enhanced.

In today's airline operations, aircraft weight determinations are typically not measured, but instead are "computed" based on a compilation of various weight assumptions added to the empty weight of the aircraft. These processes and procedures have remained relatively un-changed for the past 50 years. This method of computing the aircraft weight based on the summing of the various weight elements loaded on to a pre-measured empty aircraft weight is often referred to as the Load Build-Up Method and in this description shall continue to be referred to as the "LBUM".

The FAA has published Advisory Circular AC120-27E offering guidance for an approved method to determine the aircraft weight by "computations" which are independent of any requirement to measure of the weight of an aircraft fully loaded with passengers. The approved methods do not guarantee an accurate weight, but merely that the airline has followed approved procedures to determine the weight of the aircraft. The fully loaded weight of the aircraft is computed by a process of compiling the weights of various payload items based upon FAA "designated" average weights, for the varying elements such as passengers, carry-on baggage, checked baggage, crew weight; along with cargo weight and the weight of fuel loaded; onto a previously measured empty aircraft weight.

The FAA's AC 120-27E designated weight assumptions/allocations for airline passengers and baggage are:

| | |
|---|---|
| Average passenger weight - summer | 190.0 lb. |
| Average passenger weight - winter | 195.0 lb. |
| Average bag weight | 28.9 lb. |
| Average heavy bag weight | 58.7 lb. |

On the actual day of a flight, typically two hours prior to the departure of that flight, the flight's automated load planning program will be transferred to the desktop computer display of one of the airline's Flight Dispatchers. It is the responsibility of the Flight Dispatcher to then monitor the planned load of that flight, as ticketed and stand-by passengers check-in at the gate. The number of passengers and allocations for checked bags are input to the load-planning program. Typically this process goes without interruption and the aircraft will dispatch on schedule, as planned. As the door of the aircraft is closed and the load-plan is closed-out by the Flight Dispatcher, the "planned load" will always match the "departure load" as submitted to the FAA; because both are based on the same compilation of weight assumptions used in determining the aircraft weight using the LBUM. Many if not most airlines currently dispatch their aircraft under the FAA's approved LBUM procedures, a method which helps to keep the airlines operating on schedule.

An aircraft is typically supported by plural landing gear struts. In many if not most cases, aircraft are supported by three landing gear struts. Each landing gear strut is designed much like, and incorporates many of the features of a typical telescopic shock absorber. The shock absorber of the landing gear strut comprises internal fluids, of both hydraulic oil and compressed gas. More simply said . . . "the weight of an aircraft rests on three pockets of compressed gas." There are numerous variations of OnBoard Weight and Balance Systems ("OBWBS"), which use pressure sensors to determine the weight of the aircraft.

A question then remains; "Why not just use an OBWBS to measure the aircraft weight and CG, for every dispatch?" As good as an OBWBS might be for measuring the aircraft weight, such a system cannot plan the aircraft load. Airlines attempt to avoid any situation where a discovered discrepancy in the aircraft computed weight, identified by use of a measured aircraft weight, might result in a schedule delay. The development of a "Weight Validation Program" described in this new invention will allow Regulatory Authorities the assurance that the aircraft is being operated safely without the potential of transporting a variety of non-recognized weight errors, often missed by the LBUM.

As a point of clarification, throughout this description the use of the word "weight" can often be substituted with the use of the word "load" in that some airline operations will seek to avoid any possibility to allow the LBUM determined "take-off weight" of their aircraft be a measured weight; thus referring to loads being applied onto the landing gear struts are often preferred.

Loads applied to an aircraft landing gear strut can be measured by either monitoring changes in the pressure within the landing gear strut or monitoring changes in the deflection of the load bearing components of the aircraft such as landing gear axles and landing gear trunion pins. The trunnion pins attach the landing gear to the aircraft. Outputs of the strain gauge sensors used in monitoring axle deflection measures axle loads are typically recorded as millivolts. Outputs of the pressure sensor used in monitoring pressure within the landing gear are recorded as pounds per square inch "psi". The pressure sensors are typically temperature compensated and include temperature sensors.

Measurement of the loads applied to each landing gear strut, with the further comparison of the load distribution between the combined main landing gear (MLG) to that of the nose landing gear (NLG), allows for a measurement of the aircraft center of gravity (CG), without preforming the additional tasks of converting the measured pressure from a landing gear strut to a measured weight of the aircraft.

The present invention provides a method to validate the computed weight of an aircraft, within a specific range of weights, without actually measuring the weight of the aircraft.

The present invention offers apparatus and methods utilizing sensors for collecting landing gear load data to continually update a variety of interrelated computer software programs, creating a more advanced aircraft weight validation system.

To summarize this invention, apparatus and methods used, include:
  Pressure/temperature sensors to measure internal strut pressure and temperature
  Strain gauge sensors to measure axle deflection, as an alternative method of measuring strut load
  Aircraft inclinometer to correct for un-level aircraft
  Aircraft computer to collect aircraft and landing gear load data
  A display with keypad to input computed weight data and further indicate if computed weight and validated weight are within an acceptable range
  Software programs to determine the aircraft CG
  Software programs to determine the percentage of aircraft weight, supported by the combined MLG struts
  Software programs to determine the total pressure within the combined MLG struts
  A database, such as a look-up table used to compare measured strut loads, to a predetermined strut load range, equivalent with the percentage of aircraft weight supported by the combined MLG struts.

Referring now to the drawings, wherein like reference numerals designate corresponding parts throughout the several views and more particularly to FIG. 1 there is shown a side view of a typical Boeing 737-800 transport category "Part 25" aircraft 1, supported by tricycle landing gear configuration consisting of a NLG 3, and two identical MLGs, including a left MLG 5 and a right MLG 7 (both MLG are positioned at the same location longitudinally along the aircraft, but shown in perspective view for this illustration). The Boeing 737-800 is one of the most common commercial aircraft flown worldwide by today's airlines and shall be used as the example aircraft throughout the examples and illustrations in this invention. Also, various examples of aircraft weights and the strut pressures are given.

NLG 3, along with MLGs 5 and 7 distribute the weight of aircraft through tires 9, which in this illustration rest atop plural platform weighing scales 13, with platform weighing scales 13 resting on the ground 11. Each of scales 13 measure a portion of aircraft 1 weight, supported at each respective landing gear, and with each of the three independent scale 13 weight measurements added together, identify the total weight of aircraft 1. In this example aircraft 1 weighs 151,000 lbs.

Electronic elements which are used in this invention, and are attached to aircraft 1, are a data acquisition computer 19, aircraft inclinometer 21 to correct measured aircraft angle of inclination to that being level with the horizon, cockpit keypad/display 23 allowing pilots a means to input the aircraft's "computed" weight information into computer 19 and subsequently view a determination if the "computed" weight is verified as valid or invalid (to be explain further within this section for FIG. 1).

Figure 2:
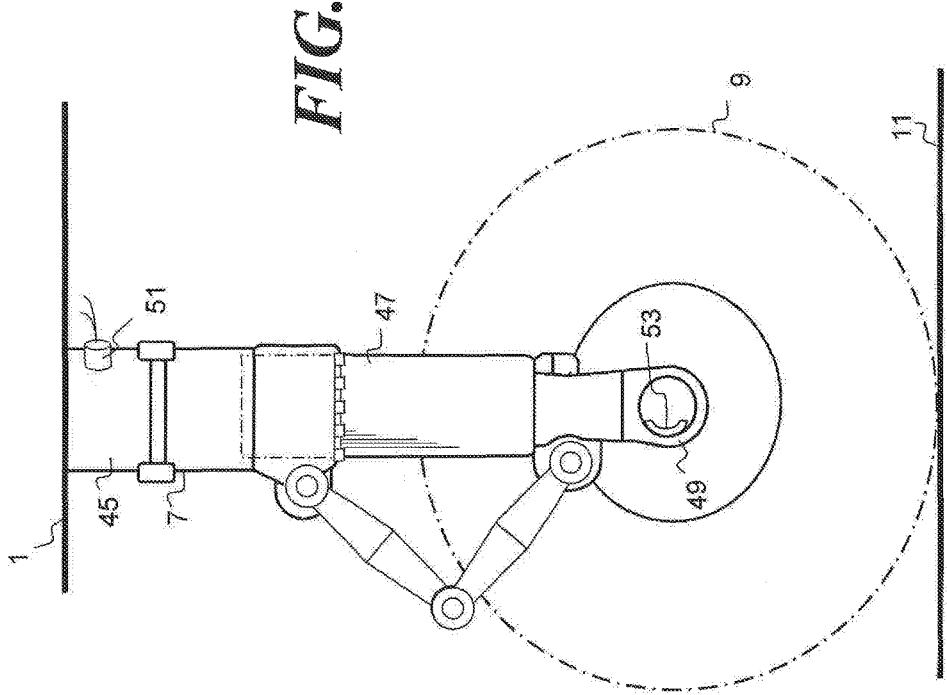
FIG. 2 is a side view of a typical aircraft landing gear strut, with various elements of the invention attached to the landing gear strut.
Figure 3:
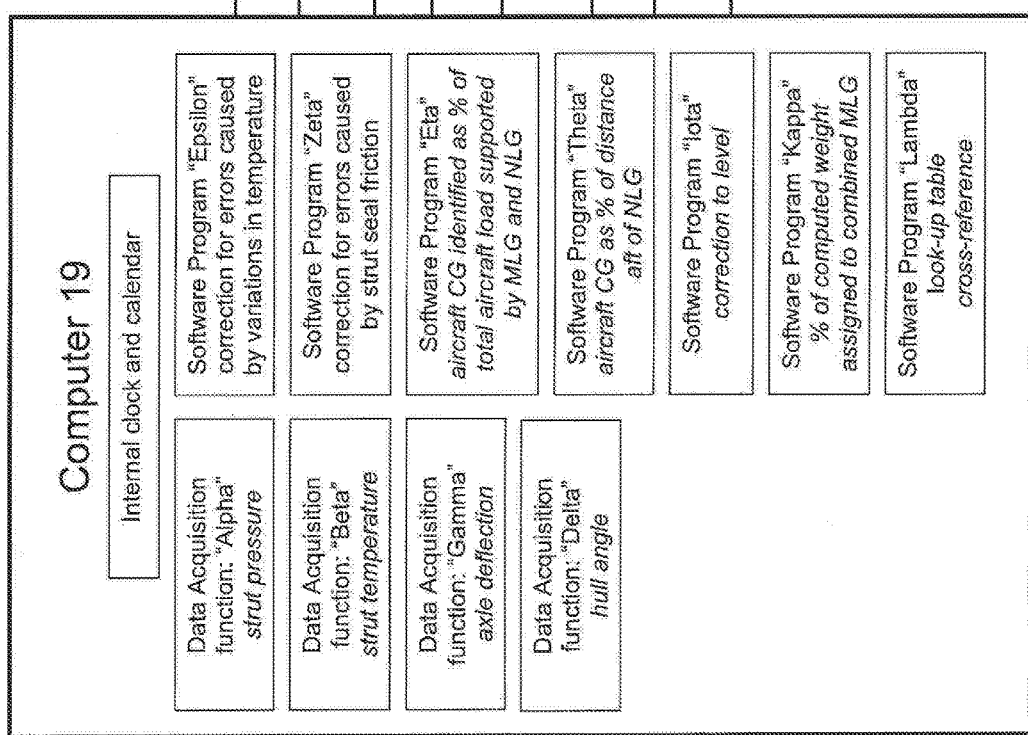
FIG. 3 is an apparatus block diagram illustrating the aircraft computer with inputs from landing gear strut pressure/temperature sensors, aircraft inclinometer, along with various software programs for measuring aircraft CG and further validating aircraft computed weight; in accordance with a preferred embodiment of the present invention.

Landing gear strut pressure sensors 51 and axle deflection sensors 53 (shown in FIG. 2) are connected to computer 19 (see FIG. 3). Computer 19 contains various internal circuitry and software programs for the collection of strut pressure, temperature and load data from respective landing gears 3, 5 and 7.

Vertical dotted line 29 of FIG. 1 illustrates the forward end of aircraft 1. Vertical dotted line 39 illustrates the aft end of aircraft 1. Horizontal line 31 illustrates the length on aircraft 1 being 1,554 inches long.

Downward pointing vertical arrow 35 illustrates the location for weight of aircraft 1, supported by the NLG 3. Downward pointing vertical arrow 37 illustrates the location for weight of aircraft 1, supported by the combined left MLG 5 and right MLG 7 (both MLG are positioned at the same location longitudinally along the aircraft, but shown in perspective view for this illustration).

The location of the aircraft CG 27 is illustrated with a black & white disk symbol. The location of aircraft CG 27 travels forward and aft along line 31, depending on the placement of weight, distributed between the location of combined MLGs 5 and 7, and in relation to the weight supported by NLG 3.

The accurate determination of aircraft CG 27 is a critical process in the load planning for aircraft 1. Though aircraft 1 is 1,554 inches in length as shown by horizontal line 31, the forward and aft limits of the operational center-of-gravity envelope are only separated by 42-inches in overall length, as illustrated by horizontal line 33. With just 42-inches of allowable certified center-of-gravity envelope, Airline Dispatchers must take great care in determining the amount and specific location of weight loaded and distributed within aircraft 1.

For Regulatory Authorities to have the justification basis to allow new procedures for airlines to use an alternate means to determine aircraft CG 27, to further validate or invalidate an aircraft's computed weight, the Regulatory Authorities must establish an Equivalent Level of Safety through the use of these new procedures. An airline's operational use of a measured aircraft CG 27 allows for a Superior Level of Safety, in comparison to the currently approved LBUM procedures, which require no physical measurement of the fully loaded aircraft when determining aircraft CG 27.

100% of the weight of the aircraft 1 rest upon the combined left and right MLGs 5, 7 and NLG 3. With the objective of the airline to not allow the aircraft weight to be measured, but still measure the aircraft CG 27, the aircraft CG 27 can be measured by the equating as a percentage, the measured landing gear strut pressure within the combined MLGs 5, 7, to that of the measured pressure within NLG 3. As the percentage of the load supported by NLG 3 changes in relation to the load supported by the combined MLGs 5, 7, then proportionally the pressure "ratio" changes between the combined MLG struts, to that of the pressure in the NLG strut (shown in FIG. 5). The location of the aircraft CG 27 is measured and identified by tracking any change in the percentage of the distance between the NLG and MLG, with such distance measured aft, from the NLG; and further comparing variations in the percentage of pressures to a previously created look-up table of associated aircraft CG values. Aircraft CG values can be identified by aircraft station number or as measured in % MAC. The relative load on the MLGs determines the location of the CG. For example, if the combined MLGs bear 90% of the total aircraft weight (with the remaining 10% borne by the NLG), then the CG is located 90% of the distance from the NLG to the combined MLGs.

Aircraft weighing scales 13 are not used in the daily flight operations of aircraft 1. Instead aircraft weighing scales 13 are used to build the cross-reference data-base for Software Program "Lambda" (further described in FIG. 3) in the initial development of software algorithms within computer 19, to correlate previously measured loads or pressures within the combined MLG struts to corresponding, previously measured weights as confirmed by platform weight scales 13. During the calibration process, scales 13 measure the weight supported at each respective landing gear strut 3, 5 and 7 and correlate the respective measured weights to the respective measured strut pressures. The weight of the aircraft is varied so as to obtain a sufficiently detailed database of weight to strut loads. One type of database is a look-up table. A database can be created for a particular aircraft model and used for all aircraft of that particular aircraft model.

Pressure recorded from pressure sensor 51 (shown in FIG. 2) from left MLG 5 is combined with the recorded pressure from right MLG 7 to determine the combined pressure from the combined MLG struts. Some larger aircraft designs have more than two MLG, thus the combination of all MLG struts pressures would be compared to the single NLG struts pressure, to further determine the CG and percentage of weight supported by the combined MLG struts.

Referring now to FIG. 2 which illustrates additional apparatus for a typical OBWBS used as a method to measure aircraft 1 weight, where there is shown a side view of a typical aircraft right MLG 7, comprising the landing gear strut cylinder 45, in which strut piston 47 moves telescopically within strut cylinder 45. A pressure sensor 51 monitors pressure within landing gear 7. All weight supported by tire 9 is transferred through axle 49, to piston 47, resulting in variations to landing gear strut 7 internal pressure, as recorded by pressure sensor 51. As weight is applied to landing gear strut 7, telescopic piston 47 will recede into strut cylinder 45, reducing the interior volume within telescopic landing gear strut 7 and increasing internal pressure in proportion to the amount of additional weight applied. Pressure sensor 51 measures changes of strut pressure. Landing gear axle 49 will deflect with changes in applied weight or loads onto MLG 7. Strain gauge sensor 53 is bonded onto axle 49, to measure axle 49 deflections as a result of changes in loads applied to MLG 7.

Referring now to FIG. 3 there is shown an apparatus block diagram illustrating computer 19, with various sensor inputs and various Software Programs; being part of the apparatus of the invention. Sensor inputs to computer 19 include multiple inputs from (respective NLG 3, left MLG 5 and right MLG 7) strut pressure sensors 51. Strut pressure sensor 51 incorporates a temperature sensor for monitoring internal temperature within the landing gear strut. Axle deflection sensors 53 are additional inputs to computer 19 and used to measure deflection of MLG 5 and MLG 7 axles, thus measuring loads supported at each strut and recorded as a millivolts output from the axle deflection sensors 53. Aircraft hull inclinometer 21, is located on any fixed, horizontal portion of the aircraft 1, and also has an input to computer 19. Computer 19 has an input/output to cockpit display/keypad 23, which allows pilots to discern information from, and input data into, computer 19.

Computer 19 is equipped with internal clock and calendar, to document the time and date of recorded sensor data.

Computer 19 has multiple data acquisition/transmission functions, which include:

Data Acquisition function "Alpha" which monitors NLG and MLG internal strut pressure, and stores the recorded data with time and date references to respective strut pressure measurements;

Data Acquisition function "Beta" which monitors NLG and MLG internal strut temperature, and stores the recorded data with time and date references to respective strut temperature measurements;

Data Acquisition function "Gamma" which monitors changes in millivolt outputs from deflection sensors on MLG axles, as a result of changes in applied loads to the MLGs;

Data Acquisition function "Delta" which monitors changes in the angle of aircraft hull in relation to the horizontal, ground, and stores the recorded data with time and date references to hull angle changes.

Computer 19 has multiple operating software programs, which include:

Software Program "Epsilon" which processes recorded temperature sensor data from the respective NLG and MLGs to resolve for pressure errors induced by variations in temperature, to identify a corrected strut pressure associated with the load supported at each respective landing gear;

Software Program "Zeta" which processes recorded pressure sensor data from the respective NLG and MLGs to resolve for pressure errors induced by landing gear strut seal friction, to identify a corrected strut pressure associated with the load supported at each respective landing gear;

Software Program "Eta" determines the aircraft CG by identifying the percentage of aircraft load supported by the combined MLG struts, in relation to the percentage of aircraft load supported by the NLG strut;

Software Program "Theta" determines the location of the aircraft CG, as the distance aft of the NLG strut, measured as a percentage of the total distance between the NLG and MLG;

Software Program "Iota" processes recorded aircraft hull inclination sensor data from the on-aircraft inclinometer to resolve to a value equivalent, and to correct CG to that of the aircraft being level with the horizon;

Software Program "Kappa" identifies the amount of "computed" weight supported by the combined MLG struts by multiplying the value of the inputted airline's compilation of "computed" weight, by the percentage of total aircraft load supported by the combined MLG; the percentage being the aircraft CG measured as a percentage of the distance between the NLG and MLG, measured aft of the NLG;

Software Program "Lambda" which incorporates a look-up table, established while the aircraft is initially resting on platform weight scales to associate measured pressures within the combined MLG struts, to weights supported by the combined MLG. In addition, the look-up table provides a predetermined range of weights. Software Program "Lambda" has multiple inter-relationships of previously measured known weights associated with previously measured known pressures. Additional interrelationships of measured weights are associated with outputs of axle deflection sensors. These inter-relationships and further determination that associated pressures and outputs identify a weight value within an "acceptable range" allows for validation or invalidation of computed aircraft weight by comparison of:

Measured combined MLG strut pressure, cross-referenced to identify an associated known weight from previous scale measurement, further compared to the current percentage of computed weight supported by the combined MLG struts, to further determine if the weight values are within an acceptable range;

Measured combined MLG axle deflection sensor outputs, cross-referenced to identify an associated known weight from previous scale measurement, further compared to the current percentage of computed weight supported by the combined MLG struts, to further determine if the weight values are within an acceptable range;

Determination of the percentage of total computed weight supported by the combined MLG struts, cross-referenced to identify a pre-measured weight supported by combined MLG struts; associated with pre-measured combined MLG strut pressures, to further determine if the predetermined pressure is within an acceptable range of the currently measured pressure.

Figure 4:
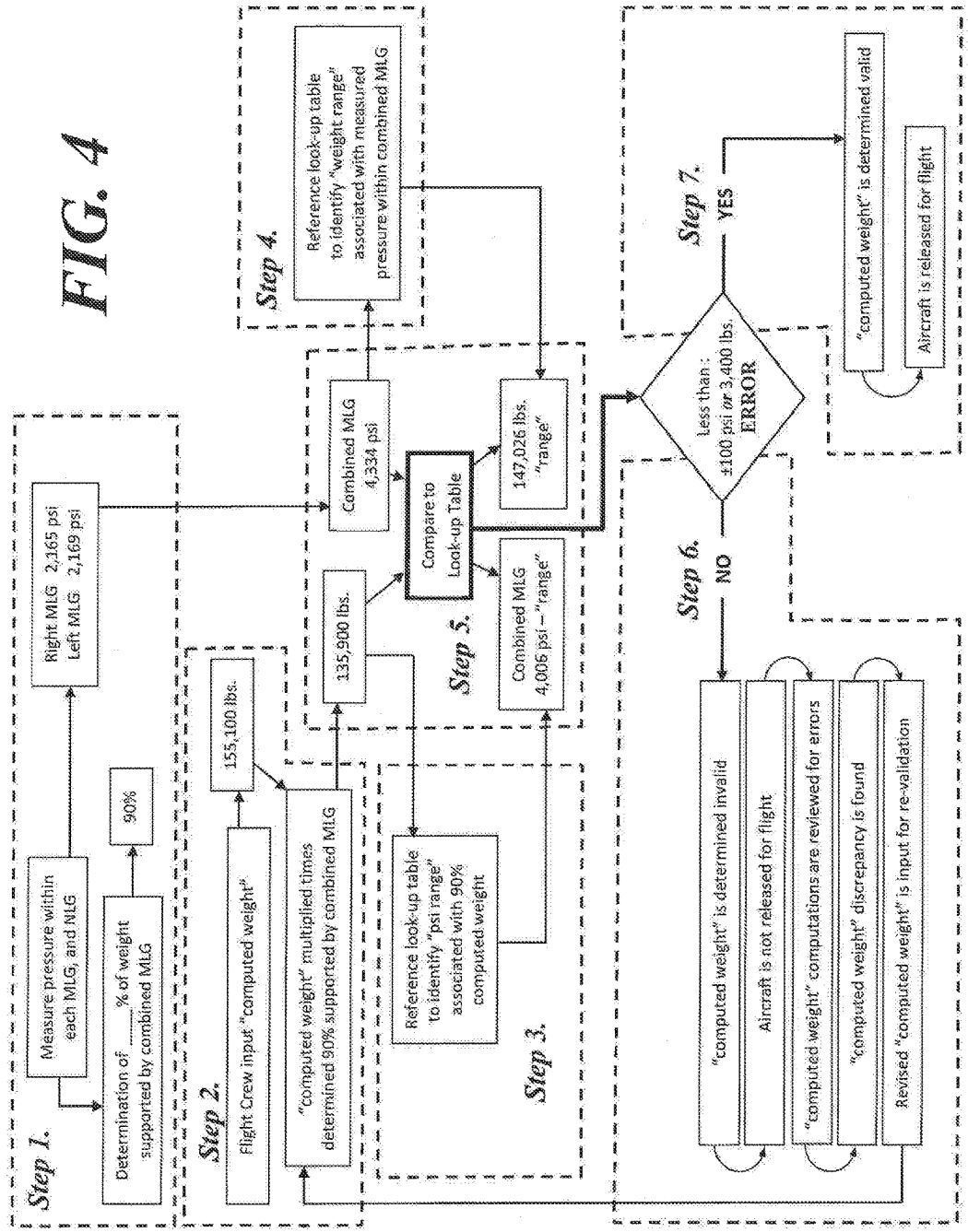
FIG. 4 is an illustration of the Steps 1-7 taken by the computer software, to validate the computed weight of the aircraft, without physically measuring the weight of the aircraft.

Referring now to FIG. 4 there is shown an illustration in an extended process design, configured within a flow-chart, for the methodology for verifying and validating the "computed weight" of the aircraft. The methods on this invention can be extrapolated across the various aircraft types, where the Boeing 737-800 aircraft is used as an example; other aircraft such as the Airbus, Bombardier or Embraer aircraft are applicable to this invention.

In this example, an on-board CG measuring system which utilizes strut pressure is used to determine if the airline's calculations of the aircraft computed take-off weight is within an acceptable range of tolerance for error, and thus is considered safe to release the aircraft for flight. An acceptable or predetermined tolerance for error will be determined by the airline and the Regulatory Authority, which regulates the operations of the airline.

Step 1. The pressures within each of the MLG and the NLG are measured with the respective pressure sensors. Software Programs "Epsilon" and "Zeta" are used to correct for possible errors due to temperature and strut seal friction. Also, Software Program "Iota" is used to correct if the aircraft hull is not level. The pressures in this example are 2,165 psi in the right MLG and 2,169 psi in the left MLG. The pressure in the NLG is 482 psi. The pressure in the combined MLGs is 4,334 psi. Software Program "Eta" then determines the aircraft CG, as a percentage of the total aircraft load, supported by the MLGs and the NLG. In the example, the MLGs support 90% of the weight of the aircraft, while the NLG supports the remaining 10%. Software Program "Theta" determines the location of the CG. In the example, the CG is 90% of the distance from the NLG to the combined MLGs. The weight of the aircraft is not, and need not be, determined. Instead, the CG and the relative amount of the total weight supported by the MLGs is determined.

Step 2. The airline's computed take-off weight for the aircraft is input into computer 19 (see FIG. 1). The computed weight data may be wirelessly transmitted to computer 19, or may be manually input into computer 19 by the aircraft flight crew on keypad/display 23 (see FIG. 1). The computed weight is determined by the LBUM method, which uses assumptions for the weights of passengers and baggage. The computed weight is also determined from data entry of other items loaded onto the aircraft, such as food, fuel, etc. In this example, the aircraft computed take-off weight is 151,000 lbs. Software Program "Kappa" applies the 90% value for the identified weight supported by combined MLGs, to the computed total aircraft weight of 151,000 lbs., to determine 135,900 lbs. is the portion of the computed weight supported by the combined MLGs.

Step 3. Software Program "Lamba" performs steps 3-7. The database, or look-up table, is used to convert weights to pressures and vice versa, for both the computed weight and the measured loads. In step 3, the computer 19 uses the amount of the computed weight supported by the MLGs to determine the corresponding amount of pressure. In the example, the computer refers to the look-up table to determine that 135,900 lbs. of computed weight supported by the combined MLGs should result in a combined MLG strut pressure in the range of 4,006 psi.

Step 4. Measured combined MLG strut pressures are compared to look-up table of previously recorded "pressure vs. weight" references to determine if the measured pressure of the combined MLGs and the 90% computed weight value are determined within an "acceptable" range. In this example, an acceptable or predetermined range is ±100 psi, being equivalent to ±3,400 lbs., or ±2% of the maximum allowable take-off weight for the Boeing 737-800 aircraft.

Step 5. Computer 19 determines from the look-up table that the measured pressure of 4,334 psi relates to an equivalent 147,026 lbs. in weight. This weight is not the weight of the aircraft as it only represents the load carried by the MLGs. Consequently, the weight obtained in this step, from the look-up table, is referred to as an approximate weight. As discussed below, the approximate weight provides the necessary accuracy for validating the computed weight, within a range of weights. The computer compares this to the 135,900 lbs., which is the 90% of computed weight supported by the MLGs, or 4,006 psi. The process then proceeds to an "ERROR decision" box to determine if the difference in 90% of computed weight and the weight associated with the currently measured pressure of the combined MLG struts, is within the acceptable range. In the example, the pressures of 4,334 psi and 4,006 psi are over 300 psi apart, and are outside of the predetermined range of ±100 psi. Likewise, the weights of 147,026 lbs. and 135,900 lbs. are outside of the predetermined range of ±3,400 lbs.

Step 6. Upon exiting the "ERROR decision" box; if the combined MLG pressure relates to a weight greater than ±3,400 lbs. of the 90% computed weight supported by the combined MLG, the negative NO path shall be taken. In this Step 6, there is shown a continuation along the NO path of the decision tree process. NO is determined when the measured pressure of the combined MLG reveals 4,334 psi, and upon referring to the look-up table, is found to be 328 psi greater than the corresponding pressure of 4,006 psi, which has been previously established as reasonable and would be associated to the 135,900 lbs. computation. The 328 psi pressure difference being greater than the ±100 psi acceptable range triggers a NO decision. An invalidation of the computed weight is determined. The measured 4,334 psi pressure within the combined MLG struts, when referenced to the look-up table, is found to be associated with 147,026 lbs.; being 11,126 lbs. greater than the 135,900 lbs., determined as the 90% of the total computed weight of the aircraft. The 11,126 lbs. difference being greater than the ±3,400 lbs. acceptable range triggers a NO decision. ±1100 psi and ±3,400 lbs. are used by way of an example, where Regulatory Authorities might establish different thresholds for an acceptable range).

In continuation of this Step 6, a determination that the 90% of computed weight supported by the combined MLG has been determined as invalid will further trigger a notification that the aircraft is not released for flight. Thus, the aircraft remains at the gate. Airline Dispatchers will subsequently review the values originally used to compile the computed weight, to identify any errors. Once the errors are identified and the weight discrepancy has been corrected, a revised computed weight is input into computer 19 to restart the weight validation process at Step 2. If the revised computed weight and associated 90% supported by the combined MLG struts is found within the acceptable range of pressure error and corresponding weight error; the process then advances to Step 7.

Step 7. Continues along the YES path of the decision tree process. If the combined MLG strut pressure is within the acceptable±100 psi range, and a validation made that the computed weight is within 3,400 lbs. of the computed weight; the computed weight is determined as valid and the aircraft is released, or dispatched, for flight. The aircraft then leaves the gate, taxis to position and takes off on the runway.

Although the example above has discussed the error determination as using both the pressure range (±100 psi range) and the weight range (±3,400 lbs.), only one need be used.

This process is developed for a particular aircraft type and model, such as with this example, the Boeing 737-800. For example, the amount of weight error tolerance allowed for the Boeing 737-800 will not be the same amount of allowable weight increase for the Boeing 737-700 aircraft. Though both aircraft are of the same 737 type, each have different overall weight limitations.

With the aircraft CG measurement system being used to physically measure the aircraft CG, to further validate the aircraft computed weight is verified within an acceptable range, pilots are assured that excessive weight errors will not go un-noticed, which might create a safety hazard for a particular flight.

Upon the validation of the computed aircraft weight predicated on a CG measurement to verify computed weights, and the apparatus to measure and verify take-off weights on all subsequent take-off events have not allowed a gross weight error to go un-recognized, a system support mechanism is created to document the processes, procedures and limitations for the use of the apparatus and methods of this invention, that Regulatory Authorities are assured an Equivalent Level of Safety is maintained. These include, but are not limited to creating and maintaining Instructions for Continued Airworthiness, addition of an Approved Flight Manual Supplement covering this new aircraft CG measuring system operation, limitations and procedures, as well as operational adjustments in the event the aircraft CG measurement system is inoperable.

Also required is a complete "Documentation of the Justification Basis" for the issuance of an Equivalent Level of Safety, Special Condition, Exemption, or other alternate means of regulatory compliance. These factors include a review of the historical basis of regulatory requirement, along with advancement in technology and operating procedures.

Continued safe operation of the aircraft will be maintained by the subsequently implemented practice of measured aircraft CG determinations being made from measured landing gear strut pressure sensor data, to further validate the computed aircraft weight, rather than relying totally on the weight assumptions made in AC120-27E.

Each of the sub-practices of this invention are elements which build upon each other, and strengthen the foundation of justification for the realization that the aircraft weight determination practices dating back 50 years, have worked well for decades, but accidents have occurred which involved the loss of human life; and the development of new technologies, procedures and the careful implementation and monitoring of such practices offer justification through a finding of an Equivalent Level of Safety, for aviation Regulatory Authorities to allow assurance that gross weight errors in the computed weight determinations based upon assumed weight values no longer go un-recognized.

Figure 5:
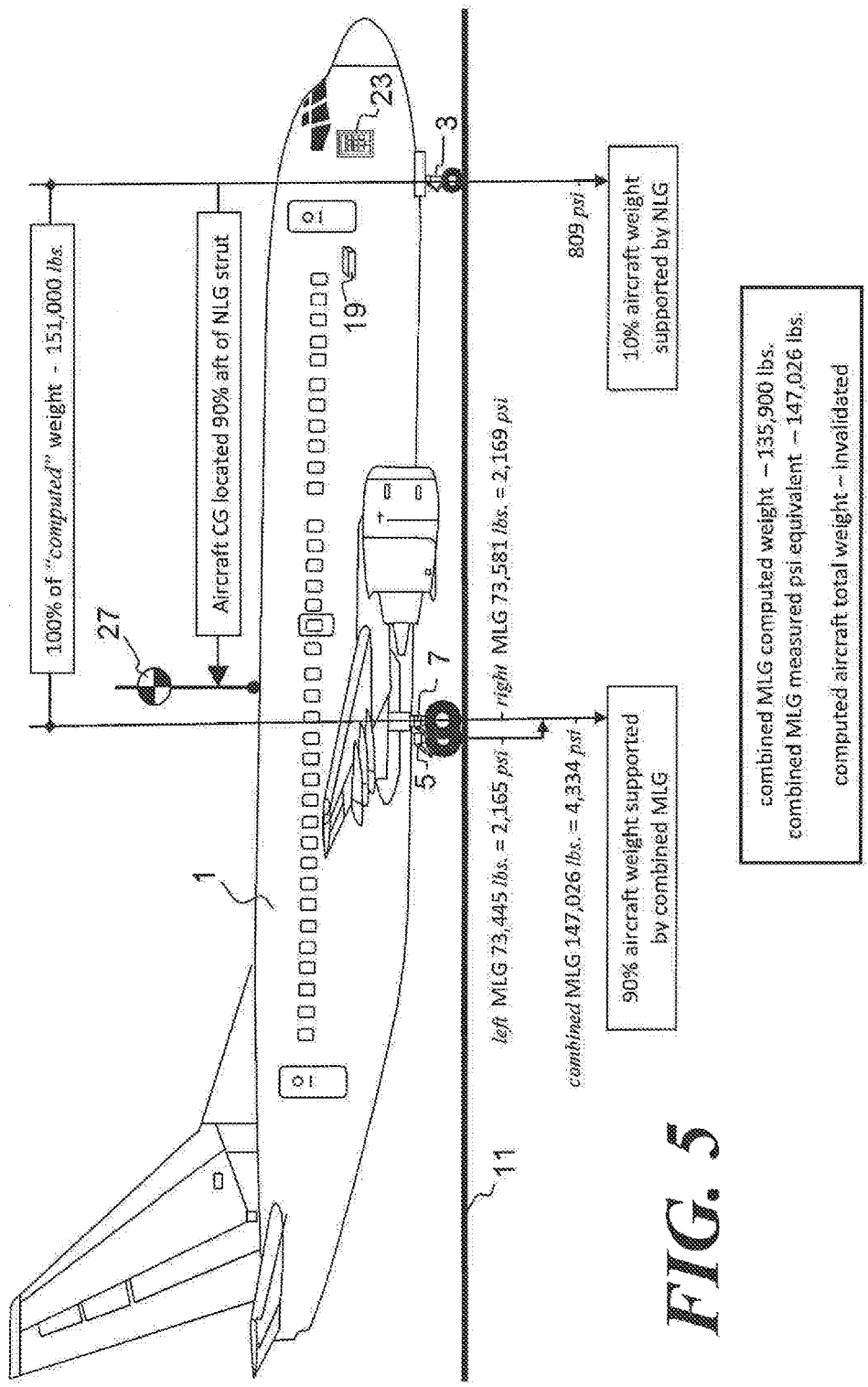
FIG. 5 is a side view of the aircraft of FIG. 1, illustrating an invalid computed aircraft weight.

Referring now to FIG. 5 there is shown an example of Step 6 "NO—invalidation" (shown in FIG. 4). Aircraft 1 "computed weight" is input into computer 19 via keypad 23. In this example 100% of aircraft 1 "computed weight" equals 151,000 lbs. Computer 19 determines the aircraft CG 27 is located at 90% of the distance between the NLG and the MLGs, measured aft of the NLG. Computer 19 thereby identifies 90% of aircraft 1 "computed weight" is supported by combined MLGs 5 and 7, and is assumed to equal 135,900 lbs. (151,000×90%=135,900). The remaining 10% of aircraft 1 "computed" weight equals 15,100 lbs. (151,000×10%=15,100) and is supported by NLG 3.

Initial calibration procedures for computer 19 develop a look-up table, which cross-references previously measured and known various weight amounts (supported by the combined MLGs 5 and 7) to the combined measured pressures within MLGs 5 and 7. In this example MLGs 5 and 7 are assumed to be supporting a computed weight of 135,900 lbs., the look-up table within computer 19 will identify a corresponding pressure associated with 135,900 lbs. for the combined MLG struts 5 and 7. The corresponding pressure, found in the look-up table, for combined MLGs is 4,006 psi.

When the measured pressures within combined MLGs 5 and 7 are within an acceptable ±100 psi range of the 4,006 psi associated with the "computed weight" of 135,900 lbs. supported by the combined weight on the MLG struts 5 and 7; the computed weight is confirmed and validated.

In this example, measured pressures within the combined MLGs 5 and 7 are significantly greater than the anticipated 4,0006 psi. Left MLG strut 5 has a pressure of 2,165 psi, associated with 73,445 lbs.; and right MLG strut 7 has a pressure of 2,169 psi, associated with 73,581 lbs.

When the measured pressures of the combined MLG 5 and 7 identify a pressure which is outside of the acceptable range of ±100 psi, then the "computed weight" supported by the combined MLG 5 and 7 is determined as invalid. In the example shown, the combined measured pressure totals 4,334 psi, identifying a weight supported by the combined MLG in the range of 147,026 lbs., again confirming the 90% of the "computed weight" of 135,900 lbs. as found to be invalid. The computed weight is too low, while the aircraft is actually heavier than it would seem from the computed weight alone.

This example of the invention uses a process to validate or invalidate only that portion of weight supported by the combined MLG struts 5 and 7, being equivalent to a range of ±90% of the total aircraft weight, depending upon where the CG is located, as a result of some particular aircraft loading distribution. If the aircraft is loaded with more weight aft, the CG may be 92% aft of the NLG. If the aircraft is loaded with more weight forward, the CG may be 88% aft of the NLG. This invention does not measure the total aircraft weight, but instead offers a tool to verify if the ±90% of aircraft "computed weight" can be determined as reasonably within an acceptable range, as related to a corresponding pressure value recorded within a look-up table. The respective airline and the Regulatory Authority, which regulates the airline, will determine the range, in which weight validations are considered acceptable.

Figure 6:
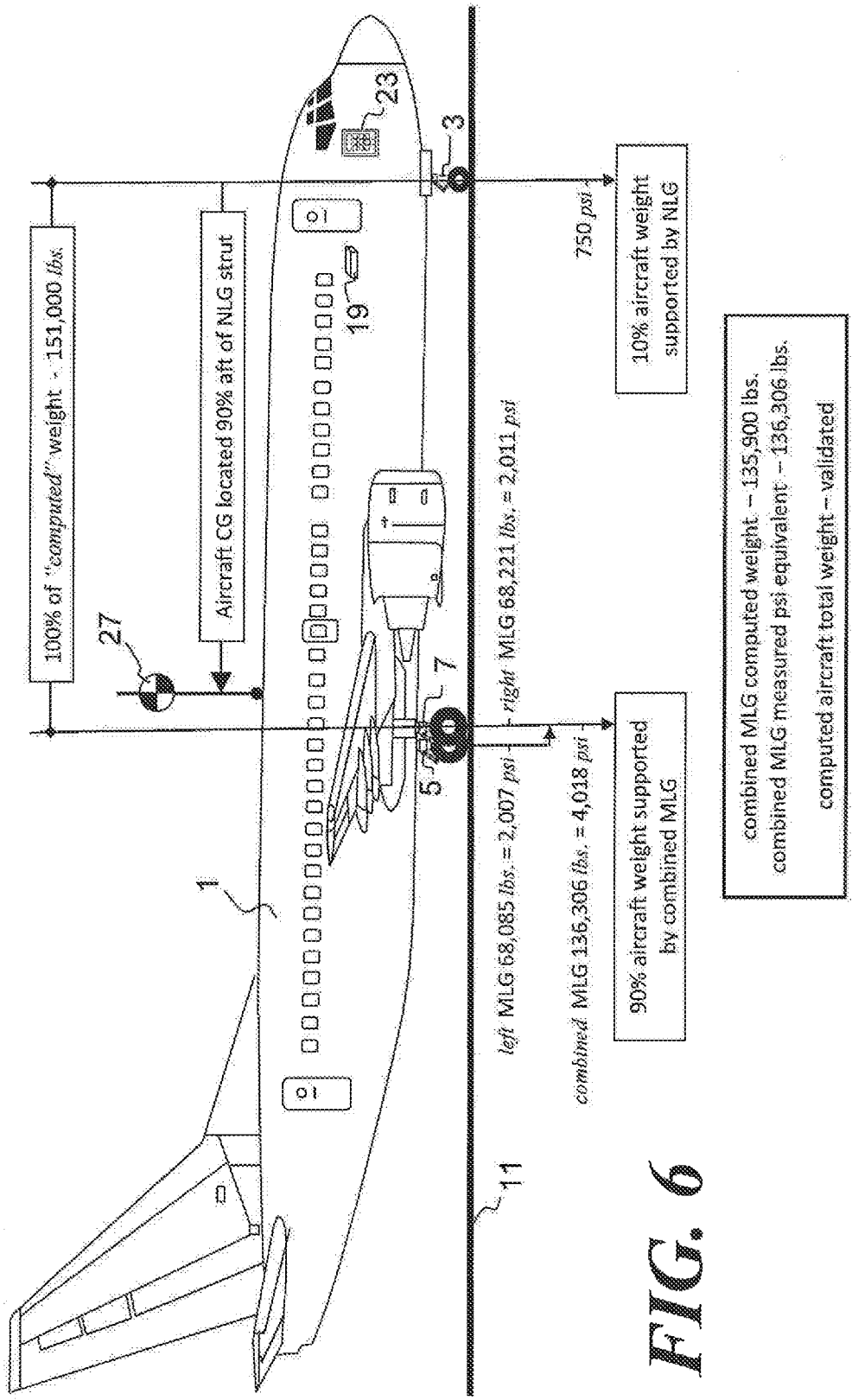
FIG. 6 is a side view of the aircraft of FIG. 1, illustrating a valid computed aircraft weight.

Referring now to FIG. 6 there is shown an example of Step 7 "YES—validation" shown in FIG. 4. In this second example the aircraft 1 "computed weight" of 151,000 lbs. is input into computer 19 via keypad 23 (shown in FIG. 1). Computer 19 determines the aircraft CG 27 is located at 90% of the distance between the NLG and the MLGs, measured aft of the NLG. Computer 19 thereby identifies 90% of aircraft 1 "computed weight" is supported by combined MLGs 5 and 7, and is assumed to equal 135,900 lbs. (151,000×90%=135,900).

Initial calibration procedures for computer 19 develop a look-up table, which cross-references previously measured and known various weight amounts (supported by the combined MLGs 5 and 7) to the combined measured pressures within MLGs 5 and 7. In this example MLGs 5 and 7 are assumed to be supporting a computed weight of 135,900 lbs., the look-up table within computer 19 will identify a corresponding pressure associated with 135,900 lbs. for the combined MLG struts 5 and 7. The corresponding pressure, found in the look-up table, for combined MLGs is 4,006 psi.

When the measured pressures within combined MLGs 5 and 7 are within an acceptable ±100 psi range of the 4,006 psi associated with the "computed weight" of 135,900 lbs. supported by the combined weight on the MLG struts 5 and 7; the computed weight is confirmed and validated.

In this example, measured pressures within the combined MLGs 5 and 7 are close to the anticipated 4,006 psi. Left MLG strut 5 has a pressure of 2,007 psi, associated with 68,085 lbs.; and right MLG strut 7 has a pressure of 2,011 psi, associated with 68,221 lbs.

When the measured pressures of the combined MLG 5 and 7 identify a pressure which is within the acceptable range of ±100 psi, then the "computed weight" supported by the combined MLG 5 and 7 is determined as valid. In the example shown, the combined measured pressure totals 4,018 psi, identifying a weight supported by the combined MLG in the range of 136,306 lbs., again confirming the 90% of the "computed weight" of 135,900 lbs. as found to be valid.

Measured pressure of the combined main struts 5 and 7 identify a pressure that is 4,018 psi and within the ±100 psi reasonable range of 4,006 psi, thus the "computed weight" supported by the combined MLG struts 5 and 7 is determined as valid. In the example shown, the combined MLG measured pressures total 4,018 psi, identifying a weight supported by the combined MLG struts closer to 136,307 lbs., again confirming the 90% of the "computed weight" of 135,900 lbs. has a difference of only 407 lbs. and identified as within an acceptable range; thus the computed aircraft weight is determined to be valid. In fact, the computed weight is shown to be very accurate.

Pressure recorded from pressure sensor 51 (as shown in FIG. 2) from MLG 5 is combined with the recorded pressure from MLG 7 to determine the combined pressure from the combined MLG struts. Some larger aircraft designs have more than two MLG, thus the combination of all MI, G struts pressures would be compared to the single NLG struts pressure, to further determine the CG and percentage of weight supported by the combined MLG struts.

Although an exemplary embodiment of the invention has been disclosed, and discussed, it will be understood that other applications of the invention are possible and that the embodiment disclosed may be subject to various changes, modifications, and substitutions without necessarily departing from the spirit and scope of the invention.

The invention claimed is:

1. A method of preparing an aircraft for take-off, the aircraft comprising main landing gear struts and a nose landing gear strut, the aircraft having a center of gravity, comprising the steps of:
   a. Loading passengers and baggage on the aircraft;
   b. Compiling a planned take-off weight of the aircraft comprising assumptions of the weight of the passengers and the baggage;

c. Measuring the aircraft load supported by the main landing gear struts and the nose landing gear strut;
d. Determining the aircraft center of gravity as a percentage of aircraft load supported by the combined main landing gear struts, from the measured aircraft load supported by the main landing gear struts and the nose landing gear strut;
e. Applying the aircraft center of gravity percentage of load supported by the combined main landing gear struts to the planned aircraft take-off weight, to further determine the amount of the planned take-off weight supported by the main landing gear struts;
f. Determining from calibration data and the measured aircraft loads applied to the main landing gear struts an associated aircraft weight supported by the main land gear struts;
g. Comparing the determined associated aircraft weight supported by the main landing gear struts to the amount of the planned take-off weight supported by the main landing gear struts and determining if the planned aircraft weight is within a predetermined, range;
h. If the planned aircraft weight is within the predetermined range, dispatching the aircraft for take-off, and if the planned aircraft weight is not within the predetermined range, holding the aircraft from taking off.

2. The method of claim 1 wherein the step of measuring the aircraft load supported by the main landing gear struts and the nose landing gear strut further comprises measuring pressure in each of the main and nose landing gear struts.

3. The method of claim 1 wherein the step of measuring the aircraft load supported by the main landing gear struts and the nose landing gear strut further comprises measuring deflection of an axle with each of the main and nose landing gear struts.

4. The method of claim 1 further comprising the step of validating the planned aircraft weight if the planned aircraft weight is within the predetermined range.

5. The method of claim 1 further comprising the step of invalidating the planned aircraft weight if the planned aircraft weight is not within the predetermined range.

6. The method of claim 1 wherein the step of holding the aircraft from taking off further comprises the aircraft operator taking steps to avoid the potential of transporting a variety of non-recognized weight errors, to further assess individual passenger weights, comparing the varying passenger weights, to that of a predetermined passenger summer weight and a predetermined passenger winter weight.

7. The method of claim 1 wherein the step of holding the aircraft from taking off further comprises the aircraft operator to assess loaded carry-on and checked bag weights, relative to that of predetermined baggage weights.

* * * * *